US012275823B2

(12) United States Patent
Lobert et al.

(10) Patent No.: US 12,275,823 B2
(45) Date of Patent: Apr. 15, 2025

(54) PROCESS FOR PRODUCING HIGH-PURITY HYDROSILYLATION PRODUCTS

(71) Applicant: Evonik Operations GmbH, Essen (DE)

(72) Inventors: Matthias Lobert, Essen (DE); Thomas Reibold, Herten (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/853,058

(22) Filed: Jun. 29, 2022

(65) Prior Publication Data

US 2023/0002561 A1 Jan. 5, 2023

(30) Foreign Application Priority Data

Jun. 30, 2021 (EP) .................................. 21182841

(51) Int. Cl.
*C08G 77/08* (2006.01)
*C08G 77/06* (2006.01)

(52) U.S. Cl.
CPC .................................. *C08G 77/06* (2013.01)

(58) Field of Classification Search
CPC ... C08G 77/06; C08G 77/08; C08K 2003/222
USPC ............................. 528/15; 524/436; 525/478
See application file for complete search history.

(56) References Cited

U.S. PATENT DOCUMENTS

| | | | |
|---|---|---|---|
| 2,823,218 A | 2/1958 | Speier et al. | |
| 3,172,899 A | 3/1965 | Bailey | |
| 3,278,457 A | 10/1966 | Milgrom | |
| 3,278,458 A | 10/1966 | Belner | |
| 3,278,459 A | 10/1966 | Herold | |
| 3,427,334 A | 2/1969 | Belner | |
| 3,427,335 A | 2/1969 | Herold | |
| 3,775,452 A | 11/1973 | Karstedt | |
| 4,083,856 A * | 4/1978 | Mendicino | C08G 77/045 549/202 |
| 5,470,813 A | 11/1995 | Le-Khac | |
| 5,482,908 A | 1/1996 | Le-Khac | |
| 5,486,634 A | 1/1996 | Hahn et al. | |
| 5,552,506 A | 9/1996 | Ebbrecht et al. | |
| 5,814,679 A * | 9/1998 | Eckberg | C09D 183/06 522/170 |
| 6,291,622 B1 | 9/2001 | Drose et al. | |
| 6,307,082 B1 | 10/2001 | Klein et al. | |
| 6,489,498 B2 | 12/2002 | Klein et al. | |
| 6,858,746 B2 | 2/2005 | Giessler et al. | |
| 7,612,158 B2 | 11/2009 | Burkhart et al. | |
| 7,825,205 B2 | 11/2010 | Knott et al. | |
| 8,198,473 B2 | 6/2012 | Ferenz et al. | |
| 8,420,748 B2 | 4/2013 | Heinning et al. | |
| 8,497,338 B2 | 7/2013 | Bai et al. | |
| 8,598,295 B2 | 12/2013 | Heinning et al. | |
| 8,883,932 B2 | 11/2014 | Brugger et al. | |
| 9,035,011 B2 | 5/2015 | Ferenz et al. | |
| 9,051,424 B2 | 6/2015 | Lobert et al. | |
| 9,334,354 B2 | 5/2016 | Ferenz et al. | |
| 9,346,919 B2 | 5/2016 | Jazkewitsch et al. | |
| 9,550,928 B2 | 1/2017 | Lobert et al. | |
| 9,896,534 B2 | 2/2018 | Lobert et al. | |
| 10,023,679 B2 | 7/2018 | Klostermann et al. | |
| 10,087,278 B2 | 10/2018 | Lobert et al. | |
| 10,301,427 B2 | 5/2019 | Lobert et al. | |
| 10,370,493 B2 | 8/2019 | Brandt et al. | |
| 10,407,546 B2 | 9/2019 | Lobert et al. | |
| 10,544,267 B2 | 1/2020 | Knott et al. | |
| 10,894,801 B2 | 1/2021 | Albert et al. | |
| 2004/0186260 A1 | 9/2004 | Hohenberg et al. | |
| 2005/0075251 A1 * | 4/2005 | Delarche | C07F 7/0879 556/400 |
| 2008/0153992 A1 | 6/2008 | Knott et al. | |
| 2012/0028022 A1 | 2/2012 | Brugger et al. | |
| 2013/0035407 A1 | 2/2013 | Lobert et al. | |
| 2013/0213267 A1 | 8/2013 | Fiedel et al. | |
| 2016/0304675 A1 * | 10/2016 | Kusunoki | C08G 77/80 |
| 2018/0016392 A1 | 1/2018 | Lobert et al. | |
| 2018/0327563 A1 | 11/2018 | Klostermann et al. | |
| 2019/0300728 A1 | 10/2019 | Klostermann et al. | |
| 2020/0207938 A1 | 7/2020 | Klostermann et al. | |
| 2021/0047474 A1 | 2/2021 | Klostermann et al. | |
| 2021/0206972 A1 | 7/2021 | Schulz et al. | |
| 2021/0238361 A1 | 8/2021 | Lobert et al. | |
| 2021/0403493 A1 | 12/2021 | Klostermann et al. | |
| 2021/0403673 A1 | 12/2021 | Klostermann et al. | |
| 2021/0403676 A1 | 12/2021 | Klostermann et al. | |
| 2021/0403678 A1 | 12/2021 | Klostermann et al. | |

(Continued)

FOREIGN PATENT DOCUMENTS

| | | |
|---|---|---|
| CN | 104 788 679 | 7/2015 |
| CN | 113 024 818 | 6/2021 |

(Continued)

OTHER PUBLICATIONS

U.S. Appl. No. 16/315,744, filed Jan. 7, 2019, US-2019/000728 AL, Oct. 3, 2019, Klostermann.
U.S. Appl. No. 16/632,922, filed Jan. 22, 2020, US-2020/0207938 A1, Jul. 2, 2020, Klostermann.
U.S. Appl. No. 16/966,914, filed Aug. 3, 2020, US-2021/0447474 A1, Feb. 18, 2021, Klostermann.
U.S. Appl. No. 17/126,172, filed Dec. 18, 2020, US-2021/0206972 A1, Jul. 8, 2021, Schulz.
U.S. Appl. No. 17/142,947, filed Jan. 6, 2021, US-2021/0238361 A1, Aug. 5, 2021, Lobert.
U.S. Appl. No. 17/321,609, filed May 17, 2021, US-2021/0403493 A1, Dec. 30, 2021, Klostermann.

(Continued)

*Primary Examiner* — Margaret G Moore
(74) *Attorney, Agent, or Firm* — Law Office of Michael A. Sanzo, LLC

(57) ABSTRACT

The present invention relates to a process for producing high-purity hydrosilylation products, and also to the products that may be produced by this process and to the use thereof as surfactants.

17 Claims, No Drawings

(56) References Cited

U.S. PATENT DOCUMENTS

| | | | |
|---|---|---|---|
| 2022/0185967 A1 | 6/2022 | Ferenz et al. | |
| 2022/0306861 A1 | 9/2022 | Klostermann et al. | |
| 2022/0315709 A1 | 10/2022 | Reibold et al. | |
| 2022/0372359 A1* | 11/2022 | Iwata | C09K 5/14 |

FOREIGN PATENT DOCUMENTS

| | | |
|---|---|---|
| DE | 1272550 | 7/1968 |
| DE | 40 03 621 | 12/1990 |
| DE | 10 2005 4676 | 8/2006 |
| EP | 0 514 737 | 11/1992 |
| EP | 3173205 | 5/2017 |
| EP | 4 194 462 | 6/2023 |
| WO | 2020/261958 * | 12/2000 |
| WO | WO 2008/017555 | 2/2008 |
| WO | WO 2012/130674 | 10/2012 |
| WO | WO 2013/017365 | 2/2013 |
| WO | WO 2015/014530 | 2/2015 |
| WO | WO 2017/213809 | 12/2017 |
| WO | WO 2022/128994 | 6/2022 |
| WO | WO 2022/229311 | 11/2022 |
| WO | WO 2022/248266 | 12/2022 |
| WO | WO 2022/248267 | 12/2022 |
| WO | WO 2023/104560 | 6/2023 |

OTHER PUBLICATIONS

U.S. Appl. No. 17/331,452, filed May 26, 2021, US-2021/0403676 A1, Dec. 30, 2021, Klostermann.
U.S. Appl. No. 17/331,429, filed May 28, 2021, US-2021/0403678 A1, Dec. 30, 2021, Klostermann.
U.S. Appl. No. 17/333,559, filed May 26, 2021, US-2021/0403673 A1, Dec. 3, 2021, Klostermann.
U.S. Appl. No. 17/523,059, filed Nov. 10, 2021, US-2022/0185967 A1, Jun. 16, 2022, Ferenz.
U.S. Appl. No. 17/705,359, filed Mar. 27, 2022, Klostermann.
U.S. Appl. No. 17/706,552, filed Mar. 28, 2022, Reibold.
European Search Report and Search Opinion for corresponding EP 21 18 2841 with partial English language machine translation of the Search Opinion attached.
He Bai, "In Situ Platinum Recovery and Color Removal from Organosilicon Streams," *Ind. Eng. Chem. Res.* *51*(50):16457-16466 (Dec. 2012).

* cited by examiner

PROCESS FOR PRODUCING HIGH-PURITY HYDROSILYLATION PRODUCTS

CROSS REFERENCE TO RELATED APPLICATIONS

The present application claims priority under 35 USC § 119 to European application EP 21182841.3, filed on Jun. 30, 2021, the contents of which is incorporated herein by reference in its entirety.

The present invention is in the field of silicones. It relates in particular to a process for producing high-purity hydrosilylation products, and also to the products that may be produced by this process and to the use thereof, particularly as surfactants.

Hydrosilylation products are understood by a person skilled in the art to be preferably SiC-bonded organomodified siloxanes, especially polyether siloxanes, which with their widely adjustable surfactant characteristics represent an industrially very important substance class.

Hydrosilylation reactions of siloxanes bearing SiH groups and/or silanes with compounds comprising a C=C double bond are carried out continuously or discontinuously and in each case in the presence of a noble metal catalyst.

Appropriate catalytically active compounds of platinum, palladium, rhodium, ruthenium, iridium and osmium are known to those skilled in the art.

In the prior art, usually employed is the platinum metal-catalyzed addition of siloxanes bearing SiH groups and silanes to olefinically functionalized compounds, such as to allyl polyethers, as described for example in the book "Chemie and Technologie der Silicone" [Chemistry and Technology of Silicones], Verlag Chemie, 1960, page 43, and in the patent literature.

The catalysts which have become established in current operational practice are predominantly Pt catalysts such as hexachloroplatinic acid (U.S. Pat. No. 2,823,218), cis-diamminedichloridoplatinum(II) and Karstedt's catalyst (U.S. Pat. No. 3,775,452).

The platinum catalysts are mostly present in the reaction mixture as homogeneous catalysts and may often remain in the final product. However, due to increasing market requirements, there also exists an ever-growing demand for Pt-free products. In addition to ecological aspects, such as the recovery of important noble metal resources, also increasingly in focus is the improvement of intrinsic product quality.

Hydrosilylation products having elevated noble metal content in general and elevated Pt content in particular usually exhibit the problem of darker colour of the product directly after production, however sometimes the colour also changes over time, both however representing a distinct quality defect. A further quality defect is also the slow formation of black particles, frequently occurring with ageing, due to precipitating noble metal.

These facts frequently result in customer complaints and this quality defect consequently should be remedied.

Diverse solution approaches are known in the prior art, such as is apparent from the scientific article *Ind. Eng. Chem. Res* 2012, 51, 16457-16466 and the literature cited therein.

In addition to membrane technology, solvent extraction and selective precipitation, the use of adsorbents is broadly established.

Suitable adsorbents are, for example, acidic or basic ion exchangers, chelating agents or functionalized silica gels (WO 2017213809 A1), activated carbon (CN 20150692397) or carbon black (CN 201510199280).

An efficient removal of noble metal can also be achieved by the use of supported catalysts. DE 1272550 B and DE 1545046 B2 describe, for example the use of elemental platinum on aluminium oxide as carrier substance for the hydrosilylation of organopolysiloxanes. Isolation of the catalyst is easily possible by simple filtration but the disadvantage here is that the supported catalyst has to be specially prepared.

U.S. Pat. No. 8,497,338 B2 describes a process based on this concept, where the hydrosilylation process is carried out in such a way that the reaction medium is fed through a catalyst fixed bed.

In addition to the problem that such a fixed bed can bleed and after a certain service life has to be exchanged with considerable technical and personnel effort, substantial investments are also required to build new plants which enable a hydrosilylation reaction on the fixed bed in continuous mode.

Since hydrosilylation reactions are predominantly carried out in batchwise or semi-batchwise mode, there is a need to facilitate a simple and particularly inexpensive process for producing hydrosilylation products, in which especially the provision of particularly high-purity hydrosilylation products is facilitated.

Only recently was such a process registered under European file number EP 20154483, which is based on the use of magnesium or aluminium silicates, optionally in the presence of water, during hydrosilylation.

Surprisingly, in the context of the present invention, it has now been found that the use of magnesium oxide as adsorbent enables a highly efficient process for preparing high-purity hydrosilylation products. The use of magnesium oxide as adsorbent gives additional flexibility to those skilled in the art, since the adsorbent may be added before, during or after the hydrosilylation reaction and in all cases results in high-purity hydrosilylation products.

In the context of the present invention, it has been found, surprisingly, that carrying out a noble metal-catalyzed hydrosilylation of a H-functional siloxane with an unsaturated organic compound when using magnesium oxide, which is added as a further separate component, results in colour-reduced and preferably colourless, and thus particularly high-purity, hydrosilylation products. The colour reduction arises compared to an otherwise analogous procedure but without using separately added magnesium oxide, which may be added before, during of after the hydrosilylation reaction.

Surprisingly, in the context of the present invention, it has further been found that even a magnesium oxide post-treatment of a noble metal-catalyzed hydrosilylation product produced from a H-functional siloxane with an unsaturated organic compound, likewise results in high-purity hydrosilylation products, wherein magnesium oxide may be added for the post-treatment as a further separate component after completion of the hydrosilylation reaction.

The present invention accordingly relates to a process for producing organically modified polysiloxanes and/or silanes by hydrosilylation, comprising the following steps:
  a) reacting at least one SiH-functional siloxane and/or silane with at least one unsaturated organic compound in the presence of a noble metal catalyst, optionally in the presence of water,
  b) optional distillation,
  c) final separation of solids, especially by filtration, wherein magnesium oxide is added as a further separate component before, during and/or after completion of the hydrosilylation reaction.

Accordingly, in the process according to the invention, at least 4 different components are added: (i) SiH-functional siloxane and/or silane; (ii) unsaturated organic compound; (iii) noble metal catalyst; (iv) magnesium oxide. Components (iii) and (iv) to be added are different components.

The present invention also relates to hydrosilylation products, produced by the process according to the invention, and also to the use thereof, for example as surfactants.

The terms "polysiloxane" and "siloxane" are used synonymously in the context of the present invention.

The subject matter of the invention will be described by way of example below, without any intention that the invention be restricted to these illustrative embodiments. Where ranges, general formulae or classes of compounds are specified below, these are intended to encompass not only the corresponding ranges or groups of compounds that are explicitly mentioned but also all subranges and subgroups of compounds that can be obtained by taking out individual values (ranges) or compounds. Where documents are cited in the context of the present description, the entire content thereof, particularly with regard to the subject matter that forms the context in which the document has been cited, is intended to belong entirely to the disclosure content of the present invention. Where chemical (empirical) formulae are used in the present invention, the specified indices can be not only absolute numbers but also average values. For polymeric compounds, the indices preferably represent average values. Unless stated otherwise, percentages are figures in percent by weight. If measured values are reported hereinbelow, these measurements, unless stated otherwise, have been conducted under standard conditions (20° C. and 1013 mbar). When average values are reported below, the values in question are weight averages, unless stated otherwise.

The word fragment "poly" encompasses in the context of this invention not just compounds having at least 3 repeating units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

In the process according to the invention, SiH-functional siloxanes are used. These are known as such to those skilled in the art. The provision of the SiH-functional siloxanes for the process according to the invention is preferably effected by performing the known prior art process of equilibration, preferably over a sulfonated resin. The equilibration of branched or linear, optionally hydrosilylated poly(organo) siloxanes having end and/or pendant SiH functions is described in detail in the prior art, for example in the documents EP 1439 200 A1, DE 10 2007 055 485 A1 and DE 10 2008 041 601. These documents are hereby incorporated by reference and are considered to form part of the disclosure of the present invention.

In the context of the hydrosilylation, any organic unsaturated compounds can be used as reaction partners of the SiH-functional siloxanes. Preference is given to using terminally unsaturated organic compounds.

For instance, in addition to terminally unsaturated allyl-functional polyethers, other low molecular weight terminally unsaturated organic compounds may also be used.

Preference is given to using terminally unsaturated polyethers such as allyl- or methallyl-functional polyethers, particularly preferably allyl polyethers. These polyethers can be produced by known processes which can be found in the prior art. The alkoxylation of unsaturated starter compounds can be produced under base, acid, or double metal cyanide (DMC) catalysis.

As an introduction to this topic, reference is made to the monograph "*Alkylene oxides and their polymers*" by F.E. Bailey, Marcel Dekker Verlag, 1991. The production and use of DMC alkoxylation catalysts has been known since the 1960s and is outlined in U.S. Pat. Nos. 3,427,256, 3,427,334, 3,427,335, 3,278,457, 3,278,458 and 3,278,459 for example. Even more effective DMC catalysts, specifically zinc-cobalt hexacyano complexes, have been developed in the meantime, for example in U.S. Pat. Nos. 5,470,813 and 5,482,908.

The terminal hydroxyl groups of the polyethers may remain in free form or may be modified partly or completely in order to be able to optimize compatibility in the later application matrix.

Conceivable modifications include not only further condensation or addition reactions with isocyanates for example, but also transesterifications, esterifications and etherifications. In the context of the present invention, the terminal hydroxyl groups of the polyethers preferably remain in free form or are in acetylated or methylated form.

The terminally unsaturated organic compounds that may be used are preferably alkene compounds bearing further substituents. It is possible to use, for example, allyl glycol, allyl glycidyl ether, glycerol monoallyl ether, allylanisole, allylphenol, eugenol, hexenol, C6-C20-alkene, vinylcyclohexene monoxide, undecylenic acid and/or methyl undecylenoate, particular preference being given to allyl glycol, tetradecene, hexadecene, octadecene, eugenol and/or glycerol monoallyl ether.

In addition to or instead of terminally unsaturated compounds, it is also possible to use compounds having internal double bonds such as norbornene derivatives or even internal alkyne compounds. However, particular preference is given to using terminally unsaturated alkenes and polyethers.

In the process according to the invention, as already mentioned in the introduction, any noble metal catalyst may be used which catalyzes an SiC bond formation reaction between an SiH-functional polysiloxane and an unsaturated compound. These are well known to a person skilled in the art.

Applicable catalytically active noble metal compounds are based in particular on compounds or complexes of platinum, palladium, rhodium, ruthenium, iridium and/or osmium.

In the context of the present invention, preferably applicable are platinum compounds such as hexachloroplatinic acid, cis-diamminedichloridoplatinum(II) and/or Karstedt's catalyst.

Pt(0) compounds such as the Karstedt complex are particularly preferably applicable as catalysts in accordance with the invention, particular preference being given to complexes having divinyltetramethyldisiloxane radicals.

In addition, however, other stable zerovalent platinum-olefin complexes are suitable, such as bis-(1,5-cyclooctadiene)platinum(0) and tris(norbornene)platinum(0), diplatinum tris(heptadiene-1,6), platinum ($\eta 2,\eta 2$-1,2,6,7-heptadiene-1,6)($\eta 2$-1,2-heptadiene-1,6) and/or platinum ($\eta 2$-ethylene)($\eta 2,\eta 2$-1,2,6,7-heptadiene-1,6).

In the context of the invention, any available quality of magnesium oxide can be used.

Preference is given to using magnesium oxide having a purity of >85%, more preferably >90%, even more preferably ≥92% and most preferably ≥97% and the bulk density is preferably <1 g/cm$^3$, more preferably ≤0.75 g/cm$^3$ and most preferably ≤0.35 g/cm$^3$. The bulk density is obtained as the quotient of the mass and the occupied volume. The bulk density can accordingly be determined by charging the substance in question into a measuring box, measuring beaker or measuring cylinder and then establishing the weight. In this way, mass per occupied volume can be determined. The bulk density is preferably determined in accordance with DIN ISO 697: 1984-01. The terms bulk density and apparent density are used synonymously.

The particle size of the magnesium oxide that may be used is preferably <10 mesh (2.00 mm), more preferably <120 mesh (0.125 mm), even more preferably <350 mesh (0.042 mm). The optimal particle size can always be adjusted to the particular application since smaller particle sizes hamper the final filtration/removal of the magnesium oxide from the reaction mixture and may result in uneconomically long filtration times. The particle size can be determined by sieve analysis. The sieve analysis can preferably be carried out in accordance with DIN 66165-1:1987-04 and DIN 66165-2: 1987-04.

"Mesh" is a known angloamerican unit and identifies the mesh size of sieves. What is meant here is the mesh numbers of the U S Bureau of Standards. The figures are the established measure in the expert field for describing the particle size, since a particle which passes through the openings of the sieve must be smaller than the mesh size of the sieve. There are conversion tables to convert the mesh numbers of the U S Bureau of Standards to mesh sizes in mm. With respect to the mesh numbers, reference is furthermore made to U S A-Standard ASTM E11 or ASTM E11-61.

The specific surface area of the magnesium oxide may be adjusted to the specific application, whereby greater surface areas effect a more efficient purification, as is plausible to those skilled in the art. The specific surface area may be preferably >10 m$^2$/g, more preferably between 30-50 m$^2$/g. The specific surface area can be determined in accordance with DIN ISO 9277: 2003-05 (BET method), or in a simplified manner also in accordance with DIN 66132: 1975-07.

It has been found, surprisingly, that the use of magnesium oxide according to the invention, which is added as a further separate component, in the context of the noble metal-catalyzed hydrosilylation of an H-functional siloxane with an unsaturated organic compound, results in colour-reduced, preferably colourless, final products.

The magnesium oxide may be added before, during and/or after completion of the noble metal-catalyzed hydrosilylation.

When carrying out the process according to the invention, it is preferable to ensure sufficient mixing. This also applies in particular to all preferred embodiments of the process according to the invention and is self-evident to those skilled in the art.

In a preferred embodiment of the process according to the invention, a SiH-siloxane and an unsaturated organic compound are initially charged and temperature-adjusted, together with magnesium oxide; the noble metal catalyst is then added and the reaction mixture is stirred at the optimally adjusted temperature until the SiH value of the reaction mixture verifies a virtually quantitative conversion (preferably >99%).

In an alternative preferred embodiment, however, it may also be advantageous to initially charge and temperature-adjust the unsaturated organic compound with magnesium oxide and catalyst, and only then to add the SiH-functional siloxane in a controlled manner.

In a further preferred embodiment, it may be advantageous to firstly initially charge the SiH-functional siloxane together with the magnesium oxide, to add the catalyst and only then to meter in the unsaturated organic compound in a controlled manner.

In a further preferred embodiment, it may be advantageous to add the magnesium oxide to the reaction mixture only after completion of the hydrosilylation and to stir at the optimal temperature adjusted to the respective reaction mixture.

The reaction mixture of all previously listed embodiments can be purified by distillation as required in order to remove low molecular weight impurities for example.

Finally, the reaction mixture is freed from solid constituents, such as magnesium oxide for example, especially by filtration, and this gives a colour-reduced, especially colourless, hydrosilylation product, particularly polyether siloxane.

It has also been found, surprisingly, that contrary to the teaching of the particularly preferred embodiment of the process of the aforementioned European patent application with the file number EP 20154483, the use of a combination of magnesium oxide and water, in the present case no even better quality product can generally be obtained. Use of the combination of magnesium oxide and water is explicitly possible, but to avoid the final separation step by distillation it is preferable to dispense with it.

The visual appearance (particularly in the form of an even lighter product) is comparable, irrespective of whether the hydrosilylation is carried out in the presence or absence of water, but the presence of water in addition to magnesium oxide has no negative influence at all on the reaction.

The amount of magnesium oxide used can be selected within broad ranges. Particularly with respect to cost-benefit analysis, amounts of preferably 0.01 to 5% by weight magnesium oxide, in a ratio to the total amount, have proven to be useful. Particular preference is given to using 0.02 to 2% by weight, especially preferably 0.1 to 0.6% by weight magnesium oxide, % by weight based on the total reaction mass. This corresponds to a particularly preferred embodiment of the invention.

The optional amount of water used can be selected within broad ranges. Particularly with respect to cost-benefit analysis, amounts of preferably 0 to 50% by weight water, in a ratio to the total amount used, have proven to be useful. Particular preference is given to using 0.25 to 5% by weight, especially preferably 0 to 2% by weight water, % by weight based on the total reaction mass. This corresponds to a particularly preferred embodiment of the invention.

The process according to the invention is preferably carried out under inert atmospheres, preferably under an argon or nitrogen stream and at temperatures of preferably 50 to 130° C.

The process according to the invention may be used to produce the polysiloxane compounds described hereinbelow for example.

Preferred polysiloxane compounds obtainable according to the invention are those of the formula (I)

$$M_a M'_b M''_c D_d D'_e D''_f T_g Q_h \quad \text{formula (I)}$$

and are characterized in that $M=[R^1_3SiO_{1/2}]$
$M'=[R^2R^1_2SiO_{1/2}]$
$M''=[R^3R^1_2SiO_{1/2}]$
$D=[R^1_2SiO_{2/2}]$
$D'=[R^2R^1SiO_{2/2}]$
$D''=[R^3R^1SiO_{2/2}]$
$T=[R^1SiO_{3/2}]$
$Q=[SiO_{4/2}]$ a=0-20, preferably 0-10, particularly preferably 2,
b=0-20, preferably 0-10, particularly preferably 0 or 2,
c=0-20, preferably 0-10, particularly preferably 0 or 2,
d=0-1000, preferably 0-500, particularly preferably 0-200,
e=0-30, preferably 1-15, particularly preferably 1-10,
f=0-30, preferably 0-15, particularly preferably 0-10,
g=0-20, preferably 0-10, particularly preferably 0-5,
h=0-20, preferably 0-15, particularly preferably 0-5,
with the proviso that the sum of a+b+c+d+e+f+g+h≥3, and the sum of b+c+e+f must be ≥1, and the sum of e+f is preferably ≥1,
and $R^1$=independently identical or different hydrocarbon radicals having 1-7 carbon atoms or H, preferably methyl, ethyl or phenyl, especially preferably methyl,
$R^2$=independently identical or different polyether radicals,
$R^3$=independently identical or different hydrocarbon radicals having 8-20 carbon atoms, which may also comprise heteroatoms and may have further substitution, preferably SiC-bonded radicals resulting from alkynediol and alkoxylates thereof, allyl glycol, allyloxyethanol, allyl glycidyl ether, glycerol monoallyl ether, allylanisole, eugenol, hexenol, hexadecene, octadecene, undecylenic acid and/or methyl undecylenate, particularly preferably hexadecene, octadecene, eugenol and/or glycerol monoallyl ether.

The preferred polysiloxane compounds of the formula (I) according to the invention are preferably obtainable by the process according to the invention described above.

The hydrosilylation products according to the invention, preferably the preferred polysiloxane compounds, especially of the formula (I), can be used for diverse applications, particularly the use as surfactants shall be mentioned. Particularly suitable is the use as dispersing additive, defoamer, wetting aid, hydrophobizing agent or crosslinking additive, preferably for use in pastes, paints, varnishes, overcoats, coatings and/or coating agents, and also in antiperspirants/deodorants, and in pharmaceutical formulations. In addition to this is the use in cleaning and/or care formulations suitable for cleaning and/or care of hard surfaces and/or suitable for cleaning, treatment and post-treatment of textiles, and also in cosmetic products. In addition to this is the further use as foam stabilizers or foam additives for polyurethane foams. In addition to this is the use as adjuvant for improving the effect of plant protection active ingredients and/or as carriers for plant protection active ingredients, wherein the plant protection active ingredients are preferably selected from microbiological plant protection active ingredients.

Methods of Measurement

In the context of the present invention, parameters or measurements are preferably determined using the methods described hereinbelow. These methods were in particular used in the examples of the present intellectual property right.

The SiH conversion of the hydrosilylation is determined by butoxide-catalyzed release of the (residual) Si—H present in the sample as elementary hydrogen and the quantitative determination thereof.

The Pt content is determined by matrix-adjusted calibration solutions on ICP-EOS (Inductively Coupled Plasma-Optical Emission Spectrometry). For this purpose, the sample to be analyzed is firstly precisely weighed and solubilized by microwave digestion with $HNO_3$/HF. Depending on the Si content—as known to a person skilled in the art—different amounts of HF are used. Subsequently, the acid is evaporated off and the residue is taken up in aqua regia and made up to a defined volume.

The content is then determined by injecting into the ICP-OES. The sample of unknown composition is measured directly following the calibration. After the measurement, it is checked with a calibration solution that stable measurement conditions were present during the measurement. The values were determined in duplicate and the results are stated as the mean of the two measurements in ppm; up to 2 ppm, with a precision of one decimal place.

Wet chemistry analysis was performed according to international standard methods: iodine value (IV; DGF C-V 11 a (53); acid number (AN; DGF C-V 2); OH number (ASTM D 4274 C).

The Hazen colour number was determined in accordance with DIN EN ISO 6271:2016-05; determination of the colour of clear liquids according to the platinum-cobalt scale.

The examples that follow describe the present invention by way of example, without any intention to limit the invention, the scope of application of which is apparent from the entirety of the description and the claims, to the embodiments specified in the examples.

Raw Materials

In the examples detailed below, the Karstedt catalyst used was platinum(0)-1,3-divinyl-1,1,3,3-tetramethyldisiloxane, 2% dissolved in xylene.

In the following examples, the following were used as adsorbents:
(I) MAGNESOL® Polysorb 3040 is a magnesium silicate from "The Dallas Group of America Inc."
(II) magnesium oxide (CAS 1309-48-4) from Roth (magnesium oxide≥98%, Ph.Eur., light.
(III) Magnesia 291 (magnesium oxide, heavy, technical grade, medium activity from MAGNESIA GmbH/Lüneburg)
(IV) Magnesia 312 (magnesium oxide, caustic burnt from MAGNESIA GmbH/Lüneburg)

EXAMPLES

Example 1a: Synthesis of an HMTS-Based Polyether Siloxane (Comparative Example)

In a 1 L flange flask provided with a dropping funnel with pressure equalization tube, thermometer, jacketed coil condenser and Sigma stirrer, 226.6 g of an allyl polyether (ethoxylate of allyl alcohol having an IV of 63 g iodine/100 g) is initially charged and the mixture heated to 90° C. with stirring and argon supply. The Karstedt catalyst is then added using a micropipette (c (batch)=4 ppm Pt). Subsequently, heptamethyltrisiloxane with a mass of 100 g (HMTS with SiH=4.50 mol/kg) is added dropwise over ca. 30 minutes via the dropping funnel such that the temperature of the reaction mixture does not exceed 115° C. After addition is complete, the mixture is further stirred at 110° C. for 1 h and then the SiH conversion is determined. This gave the SiH conversion specified in Table 1, determined by the sodium butoxide method. The mixture is then distilled for 1 h at 120° C. and p<10 mbar in order to remove volatile product constituents and then filtered through a layer filter.

Example 1b: Synthesis of an HMTS-Based Polyether Siloxane (Comparative Example)

The example was carried out analogously to Example 1a with the difference that, after addition of the allyl polyether, the amount of adsorbent (I) (based on the total mixture) specified in Table 1 was added.

Example 1c: Synthesis of an HMTS-Based Polyether Siloxane (Comparative Example)

The example was carried out analogously to Example 1a with the difference that, after addition of the allyl polyether, the amounts of adsorbent (I) and water (each based on the total mixture) specified in Table 1 were also added.

Example 1d: Synthesis of an HMTS-Based Polyether Siloxane (Inventive)

The example was carried out analogously to Example 1a with the difference that, after addition of the allyl polyether, the amount of adsorbent (II) (based in each case on the total mixture) specified in Table 1 was also added.

Example 1e: Synthesis of an HMTS-Based Polyether Siloxane (Inventive)

The example was carried out analogously to Example 1a with the difference that, after addition of the allyl polyether, the amount of adsorbent (III) (based in each case on the total mixture) specified in Table 1 was also added.

Example 1f: Synthesis of an HMTS-Based Polyether Siloxane (Inventive)

The example was carried out analogously to Example 1a with the difference that, after addition of the allyl polyether, the amount of adsorbent (IV) (based in each case on the total mixture) specified in Table 1 was also added.

Example 1g: Synthesis of an HMTS-Based Polyether Siloxane (Inventive)

The example was carried out analogously to Example 1a with the difference that, after addition of the allyl polyether, the amounts of adsorbent (II) and water (each based on the total mixture) specified in Table 1 were also added.

Example 1h: Synthesis of an HMTS-Based Polyether Siloxane (Inventive)

The example was carried out analogously to Example 1a with the difference that, after addition of the allyl polyether, the amounts of adsorbent (III) and water (each based on the total mixture) specified in Table 1 were also added.

Example 1i: Synthesis of an HMTS-Based Polyether Siloxane (Inventive)

The example was carried out analogously to Example 1a with the difference that, after addition of the allyl polyether, the amounts of adsorbent (IV) and water (each based on the total mixture) specified in Table 1 were also added.

Example 1j: Synthesis of an HMTS-Based Polyether Siloxane (Inventive)

In a 1 L flange flask provided with a dropping funnel with pressure equalization tube, thermometer, jacketed coil condenser and Sigma stirrer, 367.9 g of an allyl polyether (ethoxylate of allyl alcohol having an IV of 63 g iodine/100 g) is initially charged and the mixture heated to 90° C. with stirring and argon supply. The Karstedt catalyst is then added using a micropipette (c (batch)=4 ppm Pt). Subsequently, heptamethyltrisiloxane with a mass of 150 g (HMTS with SiH=4.87 mol/kg) is added dropwise over ca. 30 minutes via the dropping funnel such that the temperature of the reaction mixture does not exceed 115° C. After addition is complete, the mixture is further stirred at 110° C. for 1 h and then the SiH conversion is determined. This gave the SiH conversion specified in Table 1, determined by the sodium butoxide method. Subsequently, 0.65 g of adsorbent (II) is fed to the mixture and is then distilled for 1 h at 120° C. and p<10 mbar in order to remove volatile product constituents and is then filtered through a layer filter.

Example 1k: Synthesis of an HMTS-Based Polyether Siloxane (Inventive)

The example was carried out analogously to Example 1j with the difference that, after hydrosilylation was complete, the amounts of adsorbent (II) and water (each based on the total mixture) specified in Table 1 were added.

Example 1l: Synthesis of an HMTS-Based Polyether Siloxane (Inventive)

In a 1 L flange flask provided with a dropping funnel with pressure equalization tube, thermometer, jacketed coil condenser and Sigma stirrer, 367.9 g of an allyl polyether (ethoxylate of allyl alcohol having an IV of 63 g iodine/100 g) is initially charged and the mixture heated to 90° C. with stirring and argon supply. The Karstedt catalyst is then added using a micropipette (c (batch)=4 ppm Pt). Subsequently, heptamethyltrisiloxane with a mass of 75 g (HMTS with SiH=4.87 mol/kg) is added dropwise over ca. 15 minutes via the dropping funnel such that the temperature of the reaction mixture does not exceed 115° C. After addition is complete, the mixture is further stirred at 110° C. for 0.5 h and then the SiH conversion is determined. This gave the SiH conversion (1) specified in Table 1, determined by the sodium butoxide method. Subsequently, 0.65 g of adsorbent (II) is fed to the mixture. Subsequently, heptamethyltrisiloxane with a mass of 75 g (HMTS with SiH=4.87 mol/kg) is added dropwise over ca. 15 minutes via the dropping funnel such that the temperature of the reaction mixture does not exceed 115° C. After addition is complete, the mixture is further stirred at 110° C. for 1.0 h and then the SiH conversion (2) is determined. This gave the SiH conversion specified in Table 1, determined by the sodium butoxide method. The mixture is then distilled for 1 h at 120° C. and p<10 mbar in order to remove volatile product constituents and then filtered through a layer filter.

TABLE 1

Additives and analytical data for Examples 1a-l

| Example | SiH conversion [%] | Adsorbent [%] | Water [%] | Hazen value | Pt content [ppm] |
|---|---|---|---|---|---|
| 1a | 99.2 | 0 | 0 | 80 | 4.0 |
| 1b | 99.8 | 0.5 | 0 | 48 | 2.0 |
| 1c | 99.8 | 0.5 | 0.5 | 30 | 1.6 |
| 1d | 99.9 | 0.125 | 0 | 14 | 0.4 |
| 1e | 99.8 | 0.125 | 0 | 48 | 1.8 |
| 1f | 99.5 | 0.125 | 0 | 32 | 1.0 |
| 1g | 99.9 | 0.125 | 0.5 | 13 | 0.4 |
| 1h | 99.9 | 0.125 | 0.5 | 65 | 3.0 |
| 1i | 99.9 | 0.125 | 0.5 | 16 | 0.5 |
| 1j | 99.7 | 0.125 | 0 | 19 | 0.5 |
| 1k | 99.9 | 0.125 | 0.125 | 15 | 0.5 |
| 1l | 99.9 (1) 99.9 (2) | 0.125 | 0 | 17 | 0.4 |

Example 2a: Synthesis of a C16-Alpha-Olefin-Based Polyalkylsiloxane (Comparative Example)

In a flange flask provided with a dropping funnel with pressure equalizing tube, thermometer and Sigma stirrer, 250 g of a comb-positioned SiH siloxane (SiH=6.88 mol/kg, $M_2D_{5.4}D^H_{6.6}$) are initially charged and the mixture is heated with stirring and argon supply to 90° C. The Karstedt catalyst (c (batch)=3 ppm Pt) is then added using a micropipette. Subsequently, the C16 alpha-olefin with a mass of 443.9 g is added dropwise over ca. 40 minutes via the dropping funnel such that the temperature of the reaction mixture does not exceed 115° C. After addition is complete, the mixture is further stirred at 110° C. for 1 h and then the SiH conversion is determined. This gave the SiH conversion specified in Table 2, determined by the sodium butoxide method.

Example 2b: Synthesis of a C16-Alpha-Olefin-Based Polyalkylsiloxane (Inventive)

The example was carried out analogously to Example 2a with the difference that, after addition of the siloxane, the amounts of adsorbent (IV) and water (each based on the total mixture) specified in Table 2 were also added.

Example 2c: Synthesis of a C16-Alpha-Olefin-Based Polyalkylsiloxane (Inventive)

The example was carried out analogously to Example 2a with the difference that, after addition of the allyl polyether, the amount of adsorbent (III) (based in each case on the total mixture) specified in Table 1 was also added.

Example 2d: Synthesis of a C16-Alpha-Olefin-Based Polyalkylsiloxane (Inventive)

The example was carried out analogously to Example 2a with the difference that, after addition of the siloxane, the amounts of adsorbent (III) and water (each based on the total mixture) specified in Table 2 were also added.

TABLE 2

Additives and analytical data for Examples 2a-d

| Example | SiH conversion [%] | Adsorbent [%] | Water [%] | Hazen value | Pt content [ppm] |
|---|---|---|---|---|---|
| 2a | 95.9 | 0 | 0 | 38 | 2.0 |
| 2b | 93.8 | 0.25 | 0.25 | 10 | 0.6 |
| 2c | 93.0 | 0.125 | 0 | 7 | 0.5 |
| 2d | 94.8 | 0.125 | 0.5 | 26 | 1.0 |

Example 3a: Synthesis of a Comb-Positioned Polyether Siloxane (Comparative Example)

In a 1 L flange flask provided with a dropping funnel with pressure equalization tube, thermometer, jacketed coil condenser and Sigma stirrer, 202.3 g of a methylated allyl polyether (ethoxylate of allyl alcohol having an IV of 63.5 g iodine/100 g, the terminal OH group of which was methylated) is initially charged and the mixture heated to 90° C. with stirring and argon supply. The Karstedt catalyst is then added using a micropipette (c (batch)=4 ppm Pt). Subsequently, the comb-positioned SiH siloxane with a mass of 250 g (SiH=1.50 mol/kg, $M_2D_6D^H_1$) is added dropwise over ca. 30 minutes via the dropping funnel such that the temperature of the reaction mixture does not exceed 115° C. After addition is complete, the mixture is further stirred at 110° C. for 5 h and then the SiH conversion is determined. This gave the SiH conversion specified in Table 3, determined by the sodium butoxide method. The mixture is then distilled for 2 h at 120° C. and p<10 mbar in order to remove volatile product constituents and then filtered through a layer filter.

Example 3b: Synthesis of a Comb-Positioned Polyether Siloxane (Inventive)

The example was carried out analogously to Example 3a with the difference that, after addition of the allyl polyether, the amounts of adsorbent (III) and water (each based on the total mixture) specified in Table 3 were also added.

Example 3c: Synthesis of a Comb-Positioned Polyether Siloxane (Inventive)

The example was carried out analogously to Example 3a with the difference that, after addition of the allyl polyether, the amounts of adsorbent (IV) and water (each based on the total mixture) specified in Table 3 were also added.

Example 3d: Synthesis of a Comb-Positioned Polyether Siloxane (Inventive)

The example was carried out analogously to Example 3a with the difference that, after addition of the allyl polyether, the amounts of adsorbent (IV) and water (each based on the total mixture) specified in Table 3 were also added.

Example 3e: Synthesis of a Comb-Positioned Polyether Siloxane (Inventive)

The example was carried out analogously to Example 3a with the difference that, after addition of the allyl polyether, the amount of adsorbent (IV) (based in each case on the total mixture) specified in Table 3 was also added.

Example 3f: Synthesis of a Comb-Positioned Polyether Siloxane (Inventive)

In a 1 L flange flask provided with a dropping funnel with pressure equalization tube, thermometer, jacketed coil condenser and Sigma stirrer, 202.3 g of a methylated allyl polyether (ethoxylate of allyl alcohol having an IV of 63.5 g iodine/100 g, the terminal OH group of which was methylated) is initially charged and the mixture heated to 90° C. with stirring and argon supply. The Karstedt catalyst is then added using a micropipette (c (batch)=4 ppm Pt). Subsequently, the comb-positioned SiH siloxane with a mass of 250 g (SiH=1.50 mol/kg, $M_2D_6D^H_1$) is added dropwise over ca. 30 minutes via the dropping funnel such that the temperature of the reaction mixture does not exceed 115° C. After addition is complete, the mixture is further stirred at 110° C. for 1 h and then the SiH conversion is determined. This gave the SiH conversion specified in Table 1, determined by the sodium butoxide method. Subsequently, 0.57 g of adsorbent (IV) is fed to the mixture and the mixture is then distilled for 1 h at 120° C. and p<10 mbar in order to remove volatile product constituents and is then filtered through a layer filter.

Example 3g: Synthesis of a Comb-Positioned Polyether Siloxane (Inventive)

In a 1 L flange flask provided with a dropping funnel with pressure equalization tube, thermometer, jacketed coil condenser and Sigma stirrer, 202.3 g of a methylated allyl polyether (ethoxylate of allyl alcohol having an IV of 63.5 g iodine/100 g, the terminal OH group of which was methylated) is initially charged and the mixture heated to 90° C. with stirring and argon supply. The Karstedt catalyst is then added using a micropipette (c (batch)=4 ppm Pt). Subsequently, the comb-positioned SiH siloxane with a mass of 250 g (SiH=1.50 mol/kg, $M_2D_6D^H_1$) is added dropwise over ca. 30 minutes via the dropping funnel such that the temperature of the reaction mixture does not exceed 115° C. After addition is complete, the mixture is further stirred at 110° C. for 1 h and then the SiH conversion is determined. This gave the SiH conversion specified in Table 1, determined by the sodium butoxide method. Subsequently, 0.57 g of adsorbent (III) is fed to the mixture and the mixture is then distilled for 1 h at 120° C. and p<10 mbar in order to remove volatile product constituents and is then filtered through a layer filter.

Example 3h: Synthesis of a Comb-Positioned Polyether Siloxane (Inventive)

In a 1 L flange flask provided with a dropping funnel with pressure equalization tube, thermometer, jacketed coil condenser and Sigma stirrer, 202.3 g of a methylated allyl polyether (ethoxylate of allyl alcohol having an IV of 63.5 g iodine/100 g, the terminal OH group of which was methylated) is initially charged and the mixture heated to 90° C. with stirring and argon supply. The Karstedt catalyst is then added using a micropipette (c (batch)=4 ppm Pt). Subsequently, the comb-positioned SiH siloxane having a mass of 125 g (50% of the siloxane total mass) (SiH=1.50 mol/kg, $M_2D_6D^H_1$) is added dropwise over ca. 15 minutes via the dropping funnel such that the temperature of the reaction mixture does not exceed 115° C. After addition is complete, the mixture is further stirred at 110° C. for 1 h and then the SiH conversion is determined. This gave the SiH conversion (1) specified in Table 1, determined by the sodium butoxide method. Subsequently, 0.57 g of adsorbent (III) is fed to the mixture and then the comb-positioned SiH siloxane having a mass of 125 g (50% of the siloxane total mass) (SiH=1.50 mol/kg, $M_2D_6D^H_1$) is added dropwise over ca. 15 minutes via the dropping funnel such that the temperature of the reaction mixture does not exceed 115° C. After addition is complete, the mixture is further stirred at 110° C. for 1 h and then the SiH conversion is determined. This gave the SiH conversion (2) specified in Table 1, determined by the sodium butoxide method. The mixture is then distilled for 1 h at 120° C. and p<10 mbar in order to remove volatile product constituents and then filtered through a layer filter.

TABLE 3

Additives and analytical data for Examples 3a-h

| Example | SiH conversion [%] | Adsorbent [%] | Water [%] | Hazen value | Pt content [ppm] |
|---|---|---|---|---|---|
| 3a | >99% | 0 | 0 | 22 | 1.1 |
| 3b | >99% | 0.125 | 0.5 | 16 | 0.8 |
| 3c | 98.8% | 0.125 | 0.5 | 16 | 0.7 |
| 3d | >99% | 0.025 | 0.5 | 15 | 0.7 |
| 3e | >99% | 0.025 | 0 | 8 | 0.2 |
| 3f | >99% | 0.125 | 0 | 14 | 0.2 |
| 3g | >99% | 0.125 | 0 | 11 | 0.2 |
| 3h | >99.9% (1) 98.4% (2) | 0.125 | 0 | 12 | 0.2 |

Example 4a: Synthesis of a Linear Polyether Siloxane (Comparative Example)

In a 1 L flange flask provided with a dropping funnel with pressure equalizing tube, thermometer, jacketed coil condenser and Sigma stirrer, 381.8 g of an allyl polyether (copolymer of EO (60%) and PO (40%) on allyl alcohol having an IV of 49 g iodine/100 g) and 300 g of siloxane (SiH value=1.82 mol/kg, $M_2^H D_{13}$) are successively initially charged and heated to 55° C. with stirring and under argon supply. The Karstedt catalyst is then added using a micropipette (c (batch)=6 ppm Pt). The mixture is heated to 90° C. and where appropriate counter-cooled such that a temperature of 110° C. is not exceeded. Subsequently, the mixture is further stirred at 110° C. for 1 h and then the SiH conversion is determined. This gave the SiH conversion specified in Table 4, determined by the sodium butoxide method. The mixture is then distilled for 1 h at 120° C. and p<10 mbar in order to remove volatile product constituents and then filtered through a layer filter.

Example 4b: Synthesis of a Linear Polyether Siloxane (Inventive)

The example was carried out analogously to Example 4a with the difference that, after addition of the allyl polyether and siloxane, the amount of adsorbent (II) and water (each based on the total mixture) specified in Table 4 were also added.

Example 4c: Synthesis of a Linear Polyether Siloxane (Inventive)

The example was carried out analogously to Example 4a with the difference that, after addition of the allyl polyether and siloxane, the amount of adsorbent (III) and water (each based on the total mixture) specified in Table 4 were also added.

Example 4d: Synthesis of a Linear Polyether Siloxane (Inventive)

The example was carried out analogously to Example 4a with the difference that, after addition of the allyl polyether and siloxane, the amount of adsorbent (IV) and water (each based on the total mixture) specified in Table 4 were also added.

Example 4e: Synthesis of a Linear Polyether Siloxane (Inventive)

The example was carried out analogously to Example 4a with the difference that, after addition of the allyl polyether and siloxane, the amounts of adsorbent (II) and water (each based on the total mixture) specified in Table 4 were also added.

Example 4f: Synthesis of a Linear Polyether Siloxane (Inventive)

The example was carried out analogously to Example 4a with the difference that, after addition of the allyl polyether and siloxane, the amounts of adsorbent (III) and water (each based on the total mixture) specified in Table 4 were also added.

Example 4g: Synthesis of a Linear Polyether Siloxane (Inventive)

The example was carried out analogously to Example 4a with the difference that, after addition of the allyl polyether and siloxane, the amounts of adsorbent (IV) and water (each based on the total mixture) specified in Table 4 were also added.

Example 4h: Synthesis of a Linear Polyether Siloxane (Inventive)

In a 1 L flange flask provided with a dropping funnel with pressure equalizing tube, thermometer, jacketed coil condenser and Sigma stirrer, 381.8 g of an allyl polyether (copolymer of EO (60%) and PO (40%) on allyl alcohol having an IV of 49 g iodine/100 g) and 300 g of siloxane (SiH value=1.82 mol/kg, $M_2^H D_{13}$) are successively initially charged and heated to 55° C. with stirring and under argon supply. The Karstedt catalyst is then added using a micropipette (c (batch)=6 ppm Pt). The mixture is heated to 90° C. and where appropriate counter-cooled such that a temperature of 110° C. is not exceeded. Subsequently, the mixture is further stirred at 110° C. for 1 h and then the SiH conversion is determined. This gave the SiH conversion specified in Table 4, determined by the sodium butoxide method. The adsorbent (II) is then added in the amount as can be found in Table 4. The mixture is then distilled for 1 h at 120° C. and p<10 mbar in order to remove volatile product constituents and then filtered through a layer filter.

TABLE 4

Additives and analytical data for Examples 4a-h

| Example | SiH conversion [%] | Adsorbent [%] | Water [%] | Hazen value | Pt content [ppm] |
|---|---|---|---|---|---|
| 4a | 99.9 | 0 | 0 | 91 | 4.0 |
| 4b | 99.9 | 0.125 | 0 | 13 | 0.6 |
| 4c | 99.9 | 0.125 | 0 | 35 | 1.9 |
| 4d | 99.9 | 0.125 | 0 | 23 | 1.0 |
| 4e | 99.9 | 0.125 | 0.5 | 18 | 0.9 |
| 4f | 99.9 | 0.125 | 0.5 | 23 | 1.2 |
| 4g | 99.9 | 0.125 | 0.5 | 15 | 0.8 |
| 4h | 99.9 | 0.125 | 0 | 18 | 1.0 |

Conclusion

On consideration of the Hazen colour numbers and Pt contents specified in Tables 1-4, it is evident to a person skilled in the art that the best products having the lowest Hazen colour numbers and lowest Pt contents were obtained by the process according to the invention.

Carrying out the process in the presence of magnesium oxide results in higher quality products or products of comparable quality than when a combination of water and magnesium oxide is used.

Since water possibly present after completion of the reaction has to be distilled off, it is preferably processed without addition of water.

The addition of magnesium oxide before, during or after completion of the hydrosilylation results in comparable product qualities which enables the user flexible use of the adsorbent in the respective specific application.

The invention claimed is:

1. A process for producing organically modified polysiloxanes and/or silanes by hydrosilylation, comprising the following steps:
    a) initiating a reaction to produce said organically modified polysiloxanes and/or silanes in a reaction mixture formed by adding together:
        (i) an SiH-functional siloxane and/or silane;
        (ii) an unsaturated organic compound;
        (iii) a noble metal catalyst; and
        (iv) magnesium oxide;
        (v) optionally 0.25 to 5% by weight of water based on the total reaction mixture weight;
    b) optionally performing a distillation;
    c) performing a separation of solids;
    wherein:
        magnesium oxide with a purity of greater than 85% is present at the time that the reaction of step a) is initiated and/or after completion of step a); and
        sufficient magnesium oxide is added so that, compared to the process performed in the absence of said magnesium oxide, a product is made with a reduced Hazen number and with a reduced amount of catalyst in the final product.

2. The process of claim 1, wherein the magnesium oxide is added only during or after step a).

3. The process of claim 2, wherein the magnesium oxide added is at a purity of greater than 97%.

4. The process of claim 1, wherein the sole catalyst used in the process is a Karstedt catalyst and wherein the amount of catalyst in the product is reduced by greater than 50% compared to the same reaction performed without MgO.

5. The process of claim 1, wherein the unsaturated organic compound is a terminally unsaturated polyether.

6. The process of claim 1, wherein the unsaturated organic compound is a terminally unsaturated alkene compound, optionally comprising a least one substituent.

7. The process of claim 6, wherein the unsaturated organic compound is selected from the group consisting of: allyl glycidyl ether; glycerol monoallyl ether; allyl glycol; allyloxyethanol; allylanisole; allylphenol; eugenol; hexenol; C6-C20-alkene; undecylenic acid; and vinylcyclohexene monoxide.

8. The process of claim 1, wherein the unsaturated organic compound comprises one or more internal double bonds.

9. The process of claim 1, wherein the catalyst is platinum complex.

10. The process of claim 1, wherein the magnesium oxide has a purity of at least 97%.

11. The process of claim 10, wherein the magnesium oxide comprises a bulk density of <1 g/cm$^3$.

12. The process of claim 10, wherein the particle size of the magnesium oxide is <10 mesh.

13. The process of claim 1, wherein the magnesium oxide is present at 0.01% to 5% by weight based on the entirety of the total reaction mass mixture.

14. The process of claim 1, wherein the step a) takes place in presence of 0.25 to 5% by weight water, based on total reaction mixture.

15. The process of claim 14, wherein the magnesium oxide is added only after completion of step a) and is at a purity of at least 92%.

16. The process of claim 15, wherein the sole catalyst used in the process is a Karstedt catalyst.

17. The process of claim 1, wherein said magnesium oxide acts as an adsorbent and is the sole adsorbent added in the process.

* * * * *